United States Patent [19]
Spencer

[11] Patent Number: 6,040,978
[45] Date of Patent: Mar. 21, 2000

[54] PORTABLE COMPUTER HAVING FOLDING SPEAKERS

[75] Inventor: Julian A. Q. Spencer, Vermillion, S. Dak.

[73] Assignee: Gateway 2000, Inc., North Sioux City, S. Dak.

[21] Appl. No.: 08/978,909

[22] Filed: Nov. 26, 1997

[51] Int. Cl.[7] .............................. G06F 1/16; H05K 7/16
[52] U.S. Cl. ............................ 361/683; 381/300
[58] Field of Search ................. 361/683, 686; 381/349, 300, 87, 306; D14/113, 114; 364/708.1; 181/141

[56] References Cited

U.S. PATENT DOCUMENTS

| | | | |
|---|---|---|---|
| 4,764,961 | 8/1988 | Hung | 381/24 |
| 5,481,616 | 1/1996 | Freadman | 381/90 |
| 5,588,063 | 12/1996 | Edgar | 381/24 |
| 5,604,663 | 2/1997 | Shin et al. | 361/686 |
| 5,675,426 | 10/1997 | Meisner et al. | 358/838 |
| 5,701,347 | 12/1997 | Daniels et al. | 381/24 |
| 5,732,140 | 3/1998 | Thayer | 381/24 |
| 5,768,163 | 6/1998 | Smith, II | 364/705.01 |
| 5,812,369 | 9/1998 | Hsu et al. | 361/683 |
| 5,825,614 | 10/1998 | Kim | 361/683 |
| 5,838,537 | 11/1998 | Lundgren et al. | 361/683 |
| 5,852,545 | 12/1998 | Pan-Ratzlaff | 361/683 |
| 5,880,928 | 3/1999 | Ma | 361/683 |

FOREIGN PATENT DOCUMENTS

| | | |
|---|---|---|
| 0773700 | 5/1997 | European Pat. Off. . |
| 29513628 | 2/1996 | Germany . |
| 6070269 | 3/1994 | Japan . |

OTHER PUBLICATIONS

"Speaker Enclosure Design for Notebook Computer", *IBM Technical Disclosure Bulletin,* vol. 38, No. 11, 121–122, (1995).

"Speaker Enclosure Design for Notebook Personal Computer", *IBM Technical Disclosure Bulletin*, vol. 38, No. 11, Armonk, NY, US, pp. 121–122, (1995).

*Primary Examiner*—Benjamin R. Fuller
*Assistant Examiner*—Jagdish Patel
*Attorney, Agent, or Firm*—Schwegman, Lundberg, Woessner & Kluth, P.A.; Anthony Claiborne

[57] ABSTRACT

A portable computer includes a computer body. The computer body has speaker panels rotatably coupled to side portion to cover side surfaces of the computer body. Alternatively, the computer body includes a top speaker panel rotatably coupled to a front portion of the portable computer to cover a front surface of the computer body. The speaker panels have a speaker mounted therein. A variety of speakers, including an array of speakers, can also be mounted within the speaker panels. The speaker panels can have a cutout therein, and provide a protective cover to components disposed along the sides or the front surface of the computer body.

12 Claims, 5 Drawing Sheets

PORTABLE COMPUTER HAVING FOLDING SPEAKERS

FIELD OF THE INVENTION

The present invention relates generally to sound systems for portable computers (PCS). More particularly, it pertains to audio output devices for portable computers.

BACKGROUND OF THE INVENTION

Despite the increasing availability of multi-media programs, conventional portable computers have sound systems without fidelity stereo sound. With the increasing availability and lower cost of portable systems having multi-media capability, the need for better sound in such systems has become increasingly important.

Speakers for a sound system can be either external or internal to a portable computer. The external systems are usually offered as add-ons to existing PCS that did not include an internal system from the factory. In some cases, internal retrofit systems may be available for certain PCS. An external system will usually include a PCMCIA type sound driver card coupled to external speakers. A CD-ROM drive may also be added-on to complete the multi-media system. In a few instances, the CD-ROM drive includes the sound driver hardware, or a SCSI-type adapter card, which then connects to the external CD-ROM. It is possible to use a software driver in conjunction with a sound hardware card to create sounds using the basic internal speaker on a PC. However, the quality of these sounds will usually be quite poor compared with the potential quality available using a pair of external speakers, or even a pair of internal speakers when provided as part of the original PC package. External speakers range in quality from poor to very high, depending on the manufacturer and cost.

In most cases, a computer user is interested in creating a reasonably good sound system for use with the computer, but depending on the type of usage, quality of sound output could be quite critical. A child playing games may need only minimal quality to enjoy the sound effects of a particular software application. However, a music composer running composition software may need the highest quality of sound output possible from a computer system. A physically challenged individual using a computer as a vocal substitute may also require a high quality of sound output. One of the key factors to sound output quality from external speakers is the ability of the computer user to direct the sound output by adjustment of the speakers' location, rotation or inclination. The user will usually locate and orient the speakers so as to direct the sound toward the user to gain maximum clarity and effect.

When a PC is provided with an internal sound system, it usually includes a pair of speakers located within the housing of the PC. Due to the space constraints within the PC, the level of quality of the speakers themselves is often limited by their size. In addition, the overall quality of the sound system using these speakers is affected by the location of the speakers within the housing. Initially, when internal sound systems were first introduced for portable computers, the speakers were located within the main housing, adjacent to the keyboard, and oriented so that the sound projected upwards from the surface of the PC. Since the user's ears are not normally located over the surface of the PC and oriented down toward the surface, much of the sound produced by these speakers is lost, thus reducing the quality of the sound output.

Currently, a number of other speaker locations have been provided by PC manufacturers, in addition to the original housing location and surface orientation. It is quite common now to have the speakers mounted in the display housing of the PC, toward the top edge and oriented outwards, so that the sound is projected toward the user. This location and orientation increase the likelihood of the sound reaching the ears of the user, thus increasing the quality of the sound output, but are still limited by the physical constraints of display orientation. In fact, many times a user might want someone else to hear the sound better, such as an audience, or to direct the sound toward the ceiling or some other structure to take better advantage of acoustic properties of the physical environment where the system is located. Depending on the type of display provided on the PC, i.e., liquid crystal display, plasma, field effect display and other types of displays, the orientation of the display housing of the PC can also have a huge effect on the quality of the picture. Therefore, with the speakers located on the display housing, adjustment of the sound output is in direct competition with adjustment of the visual output, and the user must choose which output to optimize at the expense of the other. Since speakers on a portable computer are fixed in position, their orientation is limited to the orientation of the display.

It is possible to create an improved sound system for a portable computer by including a pair of speakers in a docking station or port replicator type unit. These units allow the user to plug in the portable computer to the docking station to which a full size external display, keyboard, and pointing device can be connected. In addition, a CD-ROM drive, additional hard disk storage, floppy drives, or internal cards can sometimes be added to the docking station. Although larger and possibly better quality speakers can be included as part of the docking station, the overall sound system quality of the portable computer will not be enhanced because the docking station is seldom transported with the portable computer. The intended purpose of the docking station is usually to create a more comfortable operator environment at a home or office and does not affect the portable computer when it is being transported somewhere else. Even though larger speakers are included in the docking station oriented toward the user, their rotation and inclination are not adjustable.

What is needed is a portable computer with a sound system that is adjustable by the user. What is also needed is a portable computer with a sound system including speakers which are positionally adjustable by the user. What is further needed is a portable computer with an adjustable sound system including speakers that are integrated into the computer system for ease of transport and use at remote locations.

SUMMARY OF THE INVENTION

A portable computer having a case and hinged display is provided with speaker panels hingedly coupled with a portion of the portable computer. The speaker panels are adjustably coupled, in one embodiment, with side surfaces of the display. Alternatively, the portable computer can also include a speaker at a top surface of the display. At least one speaker is disposed within each speaker panel. In one embodiment, an array of speakers having one or more speakers is provided in the speaker panels. The speaker array includes tweeters, mid-range speakers, woofers, and sub-woofers.

When the display and speaker panels are closed relative to the case, the speaker panels define side edges of the portable computer. In one embodiment, the speaker panel has a cut out, such that the cut out receives computer ports or other components extending from the side surface of the computer body. To open the speaker panel, a computer operator uses an opening device which is coupled with the speaker panel. The opening device includes mechanical or electro-mechanical devices.

The speaker panels beneficially provide increased adjustability of speaker angles to the user, without compromising the viewing angle of the display. Since the speaker panels can be adjusted relative to the computer, the speakers can be adjusted to fill a room with sound. In addition, the speaker panels provide protection from harsh or unclean environments to components which extend from or recede into a side surface of the computer body. When the portable computer is closed for transportation or storage, the speakers provide a continuity of a styled portable computer design. The speaker panels which are coupled with the portable computer provide a sleek and seamless appearance for the sides and front of the portable computer.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
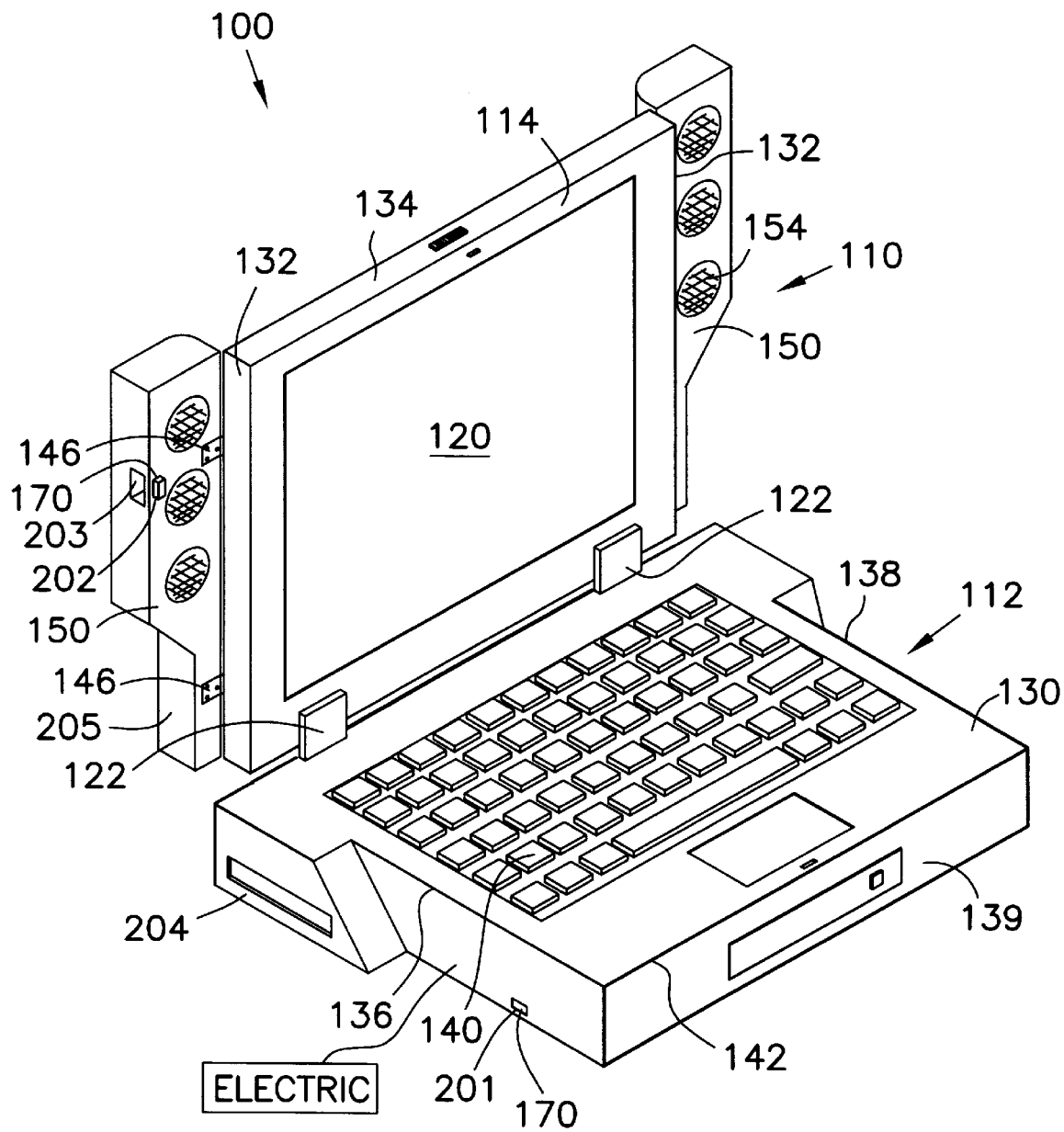
FIG. 1 is a perspective view illustrating a portable computer constructed in accordance with one embodiment of the present invention.

FIG. 1 illustrates a portable computer 100 of the present invention. The portable computer 100 comprises a standard portable computer having a system board with a processor, memory and various further integrated circuits for providing video graphics, sound functions, and I/O ports. It further includes secondary memory devices such as floppy and hard disk drives and CD capabilities. The portable computer 100 has an upper chassis 110 and a lower chassis 112. The upper chassis 110, generally having the shape of a rectangular panel, has a bezel 114, which is integral with the upper chassis 110. In one embodiment, the bezel 114 encompasses a display 120 therein. The display 120 is an LCD screen or other equivalent, as known by those skilled in the art. The bezel 114 and the display 120 pivot about a display hinge 122, providing adjustability for the display 120. The display hinge 122 connects the lower chassis 112 of the portable computer 100 with the upper chassis 110, and allows for the upper chassis 110 to be closed upon the lower chassis 112, as shown in FIGS. 2A, 2B, 4A and 4B.

Referring again to FIG. 1, the portable computer 100 is encompassed by a computer body 130. The bezel 114 has side surfaces 132 and a top surface 134. A data entry device 140 is disposed in the lower chassis 112 between a first and second edge portion 136, 138 of the lower chassis 112. A third edge portion 142 is formed between the data entry device 140 and a front surface 139.

A side speaker panel 150 is coupled with the bezel 114. In one embodiment, two side speaker panels 150 are provided, and are rotatably coupled with the bezel 114. At least one hinge 146 couples each speaker panel 150 with the bezel 114. The hinge 146 may extend the entire length of the speaker panel 150, or only a portion of the speaker panel 150. Alternatively, in another embodiment, a plurality of smaller hinges are provided proximate the side surfaces 132 of the bezel 114. In yet another embodiment, the hinge 146 could provide a spring bias to the side speaker panels 150. Although hinge 146 is described herein, other rotational devices such as bearings or axial assemblies could be incorporated and are considered within the scope of the present invention. Further, the hinge may be easily detachably coupled to the bezel 114 or other portions of the display 120 or the computer body 130.

The side speaker panel 150 is comprised of a substantially rigid material, and, in one embodiment, extends substantially the entire length of the bezel 114. Alternatively, the side speaker panel 150 can be less than the entire length of the bezel to allow access to various ports or components, such as component 204 on the lower chassis 112 when the speaker panel 150 is placed in a closed position. In another embodiment, a plurality of side speaker panels 150 are provided proximate the side surfaces 132.

Figure 2A:
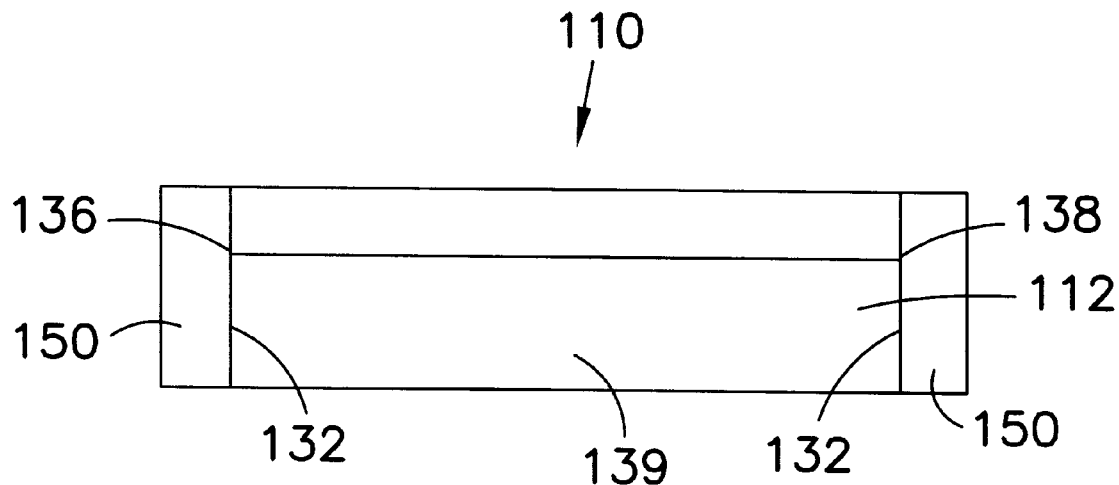
FIG. 2A is a first side elevational view illustrating a portable computer constructed in accordance with one embodiment of the present invention.
Figure 2B:
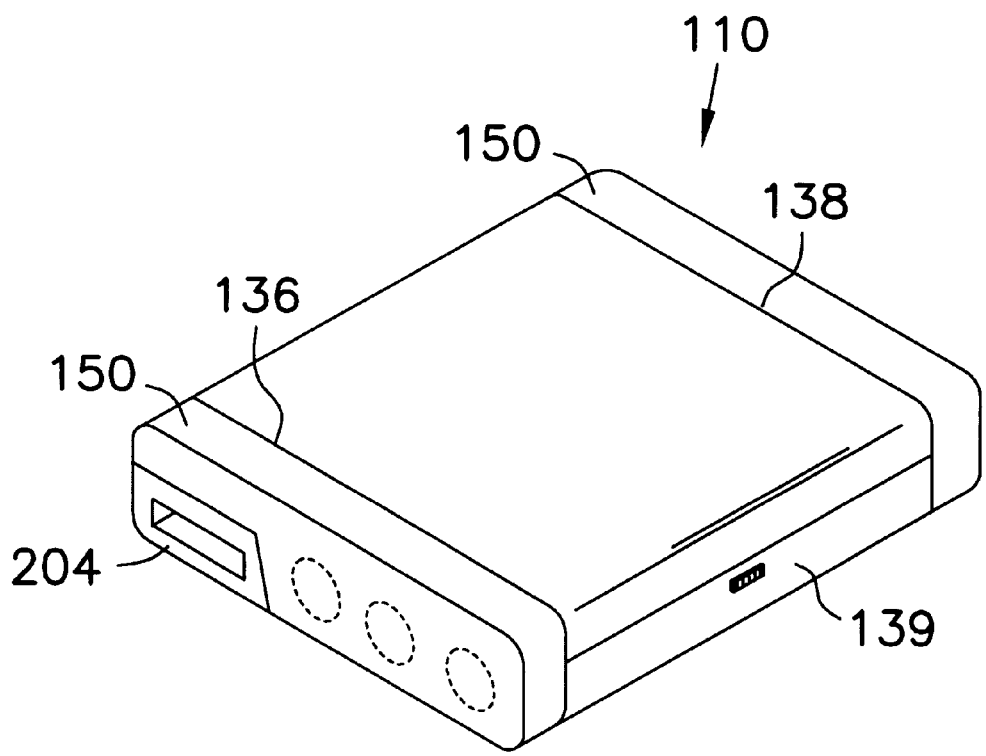
FIG. 2B is a perspective view illustrating a portable computer constructed in accordance with another embodiment of the present invention.

The side speaker panel 150 is shown in a closed position in FIGS. 2A and 2B. The side speaker panels 150, in one embodiment, extend substantially along the side surfaces 132 of the bezel 114, the panel 150 including a cut out section 205 (FIG. 1). The display 120 is placed proximate to the data entry device 140 such that the hinges 146 are placed proximate the first and second edge portions 136, 138 in the closed position. The side speaker panels 150 fold over the first and second edge portions 136, 138 such that the speaker panels 150 form sides of the portable computer 100 when the speaker panels 150 are in a closed position. The speaker panel cut out section 205 has a shape that is adapted to receive component 204. When the speaker panels 150 are closed, the panels 150 protect the components thereunder, as will be discussed further below. The panels 150 further provide a seamless appearance to the side portion of the portable computer 100.

Each side speaker panel 150 has at least one speaker 154 therein. Alternatively, an array of speakers 156 are disposed within each side speaker panel 150. The speaker can include a tweeter, a mid-range, a woofer, or a sub-woofer. Alternatively, other types of speakers can also be included, and are considered within the scope of the invention. The speakers 156 and each speaker 154 are operatively coupled with the printed circuit board, which provides the audio signal to the speakers. Each speaker 154 is contained within the side speaker panel 150 such that the panel 150 can be closed against the side surfaces 132 of the computer body 130. The speaker panel 150, alternatively, is provided with a friction fitting to retain the panel 150 in a closed position, as shown in FIG. 2A.

In one embodiment, the side speaker panel 150 is provided with an opening device. The opening device 170 (FIG. 1), in one embodiment, is a mechanical device, such as a cut out 201 and a corresponding friction-fitted projection, magnets, or a latching mechanism 202. A opening cut out 203 could be disposed in the speaker panel 150 to facilitate rotating the speaker panel 150 away from the computer body 130. Alternatively, the opening device comprises an electro-mechanical device, as known by those skilled in the art. The opening device allows for securing the upper chassis 110 with the lower chassis 112 while also facilitating placing the portable computer 100 in an open position from a closed position. In another embodiment, the opening device 171 comprises a plurality of tendon lines shown in FIG. 3. The tendon lines 135 have limited elasticity and are anchored to the lower chassis 130. The tendon lines 135 are also separately coupled with the side speaker panels 150 and the top speaker panel 160 such that as the upper chassis 110 is moved away from the lower chassis 112, the speaker panels 150, 160 open out away from the display 120.

Figure 3:
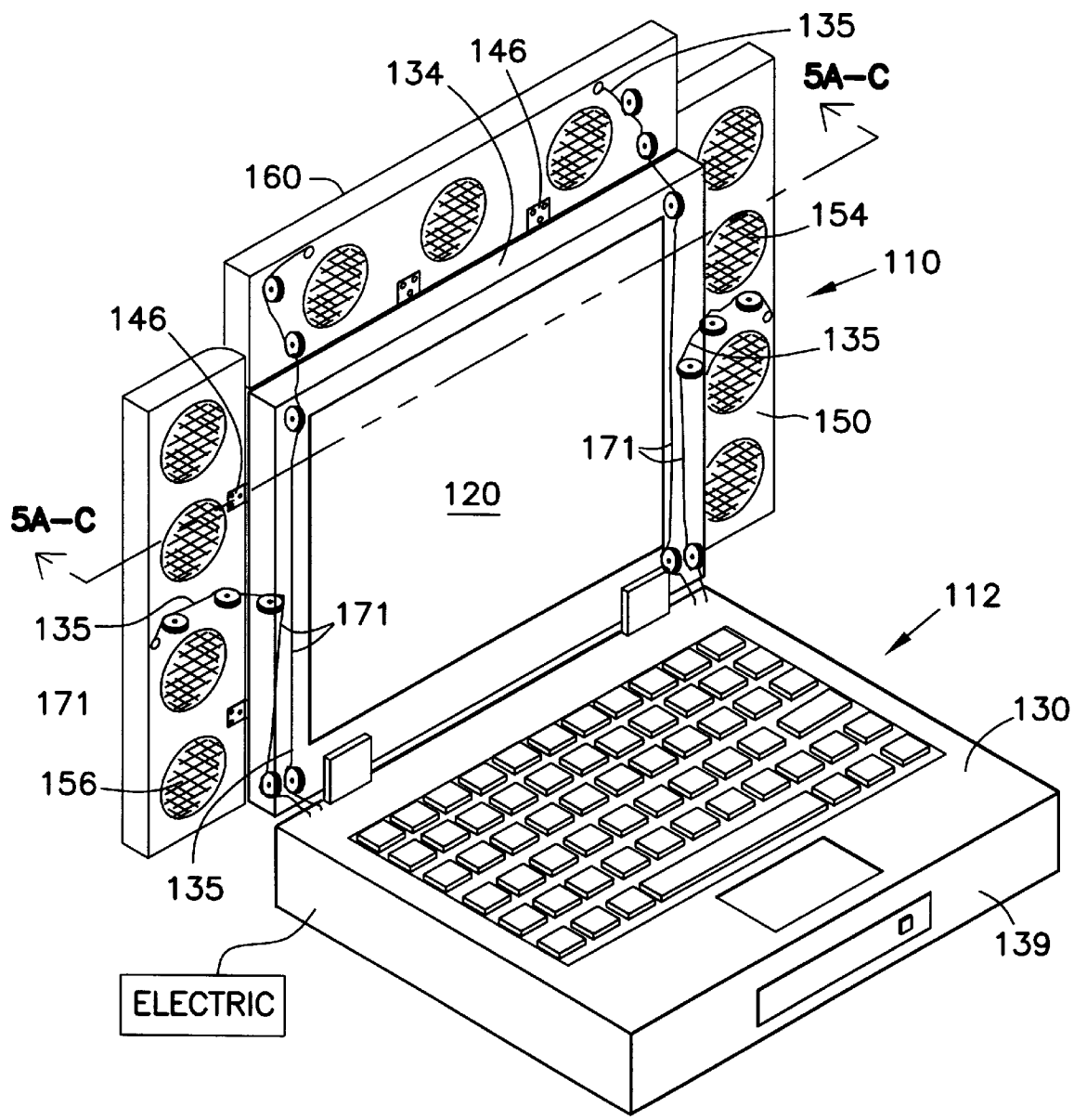
FIG. 3 is a perspective view illustrating a portable computer constructed in accordance with one embodiment of the present invention.
Figure 4A:
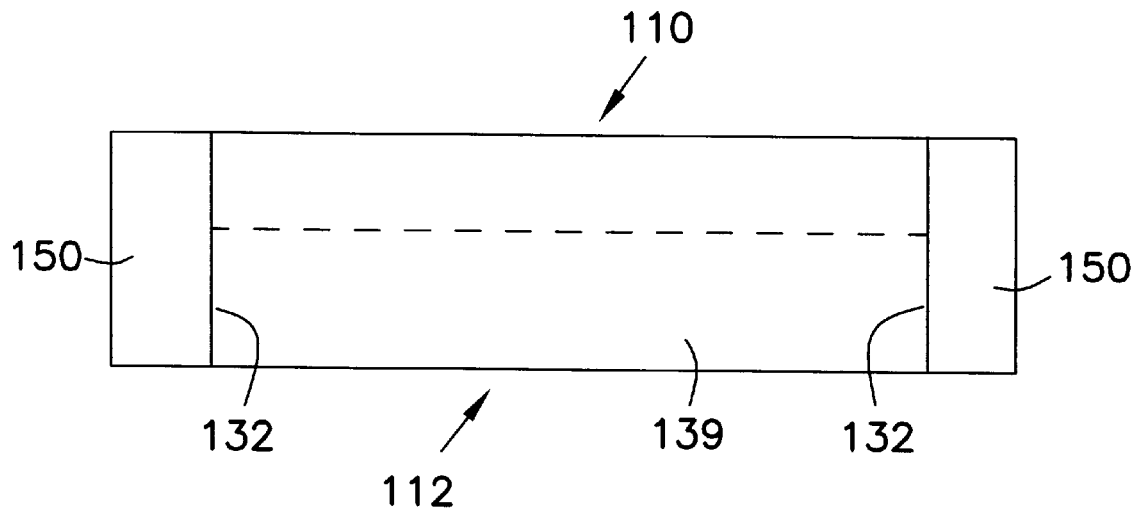
FIG. 4A is a first side elevational view illustrating a portable computer constructed in accordance with one embodiment of the present invention.
Figure 4B:
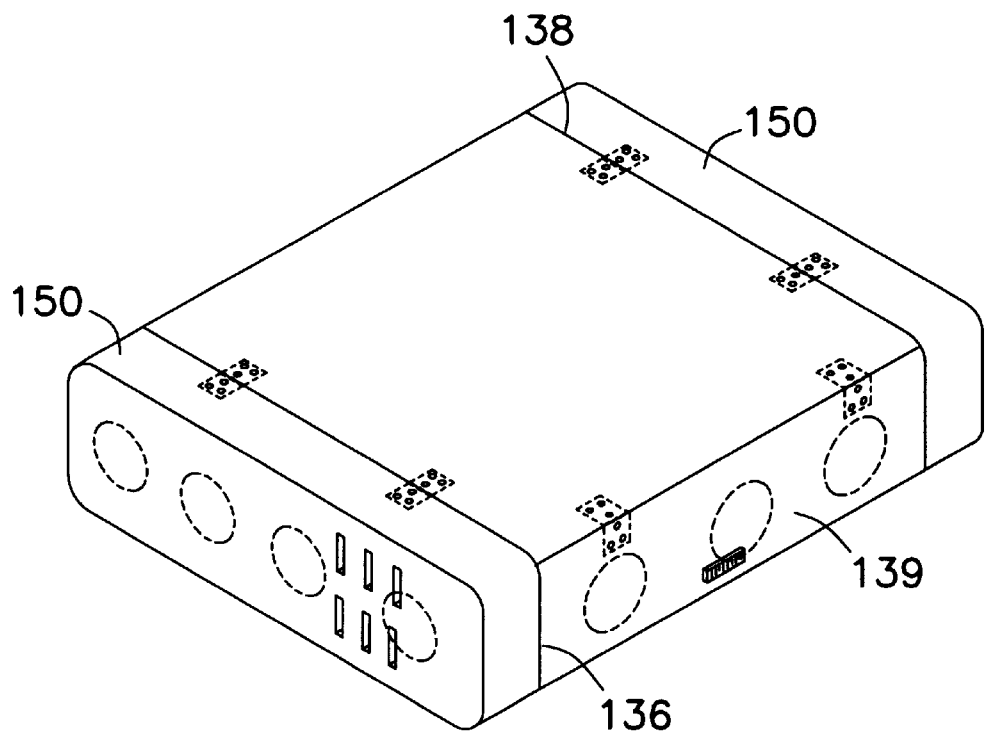
FIG. 4B is a perspective view illustrating a portable computer constructed in accordance with another embodiment of the present invention.

FIG. 3 illustrates another embodiment of the present invention. As shown, the computer body 130 has two side speaker panels 150 coupled therewith. In addition, a top speaker panel 160 is coupled with the computer body 130. The side speaker panels 150 and the top speaker panel 160 are each rotatably coupled with the computer body 130 with at least one hinge 146. In one embodiment, as shown in FIG. 4B, the speaker panels 150 have a plurality of ports for better acoustics for the audio output devices. Referring again to FIG. 3, in another embodiment, a plurality of hinges are provided on each speaker panel. The side speaker panels 150 and the top speaker panel 160 have at least one audio output device 154 therein. As discussed above, the audio output device 154 can be a speaker or an array of speakers, as well as other audio output devices.

The top speaker panel 160 is coupled at the top surface 134 of the computer body 130. In a closed position, the top speaker panel 160 folds over the front surface 139 of the computer body, as shown in FIGS. 4A and 4B. When components are disposed on the front surface 139, the top speaker panel 160 beneficially covers these components in a closed position and provides added protection to these components during transportation of the portable computer 100.

Figure 5A:
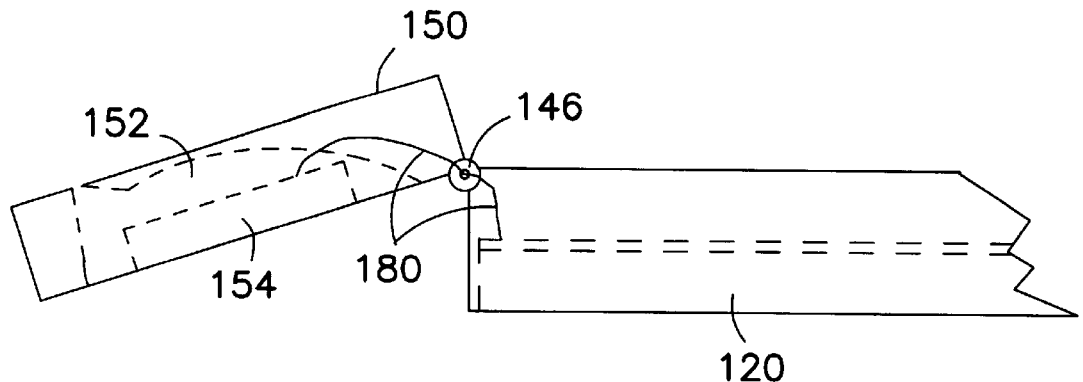
FIG. 5A is an enlarged sectional view taken along 5A–C—5A–C of FIG. 3 illustrating a portable computer constructed in accordance with another embodiment of the present invention.
Figure 5B:
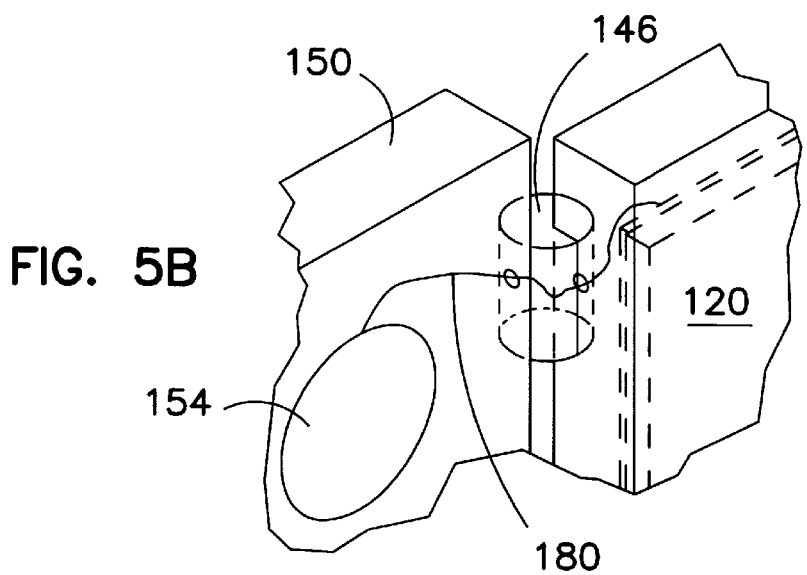
FIG. 5B is an enlarged sectional view taken along 5A–C—5A–C of FIG. 3 illustrating a portable computer constructed in accordance with another embodiment of the present invention.
Figure 5C:
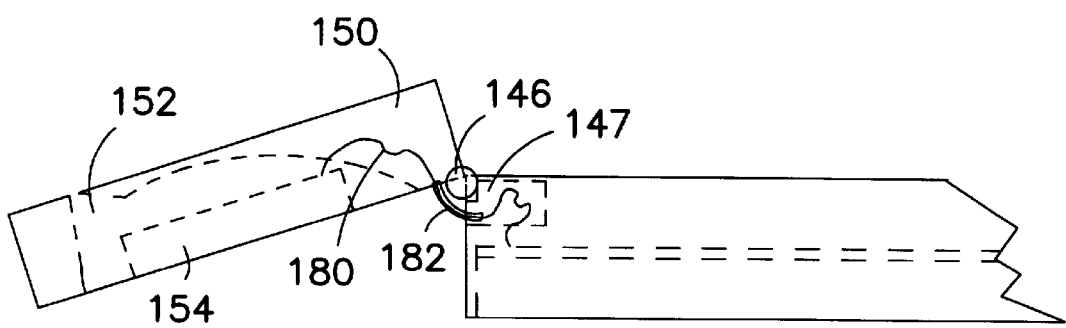
FIG. 5C is an enlarged sectional view taken along 5A–C—5A–C of FIG. 3 illustrating a portable computer constructed in accordance with another embodiment of the present invention.

For the above embodiments, the audio output devices 154 are each operatively coupled with either the upper chassis 110 or the lower chassis 112, or both. The audio output devices 154 are coupled such that audio signals are delivered to the audio output devices 154. In one embodiment, the audio output devices 154 are coupled with a cable 180 disposed internal to the panel 150 and the hinge 146 as shown in FIGS. 5A and 5B. The cable 180 is disposed through the hinge 146 between the display 120 and the panels. Alternatively, in another embodiment, the audio output devices 154 are coupled with a cable 180 which is disposed at least partially within the speaker panel and the chassis, but external to the hinge 146, as shown in FIG. 5C. For this embodiment, the computer body 130 has a cavity 147 therein. The cavity 147 houses the cable 180 as the speaker panels are placed in an open and closed position. An insulative coating 182 or equivalent is disposed on the exposed portion of the cable 180 and protects the cable 180 from the environment. The coating 182 also provides a strain relief to the cable 180 as the speaker panels 150 are placed in an open and closed position.

The folding function of the speaker panels advantageously provide increased adjustability of speaker angles to a user, without compromising the viewing angle of the display. The speaker panels allow computer manufacturers to place the speaker components external to the main portion of the portable computer, thereby increasing the amount of useable internal space. In addition, the speaker panels provide protection from harsh or unclean environments to components which extend from or recede into a side surface of the computer body. A further advantage provided by the speaker panels is the seamless appearance on the side of the portable computer. The speaker components also can be easily replaced upon becoming worn or damaged.

It is to be understood that the above description is intended to be illustrative, and not restrictive. Many other embodiments will be apparent to those of skill in the art upon reviewing the above description. For instance, the present invention could be incorporated with other electronic components and still considered within the scope of the invention. The scope of the invention should, therefore, be determined with reference to the appended claims, along with the full scope of equivalents to which such claims are entitled.

What is claimed is:

1. A portable computer adapted for use with multi-media applications, the portable computer comprising:

a computer body having a front portion and two side surfaces;

a processor and a memory encompassed by the computer body;

a display rotatably coupled with the computer body;

at least one speaker panel coupled proximate to the display;

at least one audio output device disposed within the at least one speaker panel; and an opening device operatively coupled with a at least one speaker panel and the computer body for moving the at least one speaker panel from a closed position to an open position.

2. The portable computer as recited in claim 1, wherein the at least one speaker panel is rotatably coupled with the display.

3. The portable computer as recited in claim 1, wherein the opening device is selected from the group consisting of a mechanical device and an electro-mechanical device.

4. The portable computer as recited in claim 1, wherein the audio output device comprises at least one selected from the group consisting of a tweeter, a mid-range speaker, a woofer, and a sub-woofer.

5. The portable computer as recited in claim 1, wherein an array of speakers are disposed within the at least one speaker panel.

6. A portable computer adapted for use with multi-media applications, the portable computer comprising:

a computer body having a front portion, two side surfaces, and at least one component extending from at least one of the two side surfaces;

a processor and a memory encompassed by the computer body;

a display having plural side surfaces and a top edge surface, the display rotatably coupled with the computer body;

at least one speaker panel rotatably coupled proximate to the display, the at least one speaker panel having a cut out section therein for receiving the at least one component when the at least one speaker panel is rotated to a closed position; and at least one audio output device disposed within the at least one speaker panel.

7. The portable computer as recited in claim 6, wherein the at least one speaker panel comprises a first speaker panel and a second speaker panel, and each speaker panel is disposed on each side surface of the display.

8. The portable computer as recited in claim 7, wherein each speaker panel being disposed over each side surface of the computer body when each speaker panel being in a closed position.

9. The portable computer as recited in claim 7, wherein each speaker panel extends substantially along each side surface of the display.

10. The portable computer as recited in claim 7, wherein each speaker panel substantially covers each side surface of the computer body when each speaker panel is placed in a closed position.

11. The portable computer as recited in claim 7, further comprising a top speaker panel coupled with the top edge surface of the display.

12. A portable computer adapted for use with multi-media applications, the portable computer comprising:

a computer body having a front portion, a rear portion, two side surfaces, and at least one component extending from at least one of the two side surfaces;

a display coupled with the rear portion of the computer body, the display having two side surfaces and a top surface;

a display hinge disposed between the display and the computer body, the display hinge for rotatably coupling the display with the computer body;

a processor and a memory encompassed by the computer body;

a data entry device disposed proximate to the front portion of the computer body;

a side speaker panel coupled proximately to each side surface of the display, the side speaker panel substantially covering each side surface of the computer body;

a top speaker panel coupled with the top surface of the display, the top speaker panel for covering at least a portion of the front portion of the computer body;

a hinge disposed between the speaker panels and the display, thereby rotatably coupling the side speaker panel and the top speaker panel with the display;

each side speaker panel having a cut out section therein, the cut out section for receiving the at least one component; and at least one speaker disposed within the side speaker panel and the top speaker panel.

* * * * *